United States Patent [19]
Feuling

[11] Patent Number: 5,501,191
[45] Date of Patent: Mar. 26, 1996

[54] COMBUSTION CHAMBER SYSTEM HAVING AN IMPROVED VALVE ARRANGEMENT

[76] Inventor: James J. Feuling, 2521 Palma, Ventura, Calif. 93003

[21] Appl. No.: 246,788

[22] Filed: May 19, 1994

Related U.S. Application Data

[63] Continuation-in-part of Ser. No. 995,785, Dec. 23, 1992, Pat. No. 5,313,921.

[51] Int. Cl.$^6$ .................................................. F02P 15/02
[52] U.S. Cl. .................................................. 123/310
[58] Field of Search .................................. 123/310, 256, 123/279, 661

[56] References Cited

U.S. PATENT DOCUMENTS

| | | | |
|---|---|---|---|
| 2,111,601 | 3/1938 | Rabezzana et al. | 123/310 |
| 2,338,959 | 1/1944 | Nallinger et al. | 123/310 |
| 4,702,804 | 5/1988 | Suzuki et al. | 123/310 |

*Primary Examiner*—Raymond A. Nelli
*Attorney, Agent, or Firm*—John R. Duncan; Frank D. Gilliam

[57] ABSTRACT

An intake and exhaust system for use with internal combustion engines that uses two intake valves and one exhaust valve for each engine cylinder. The three valves are preferably round and spaced around the cylinder centerline in the cylinder head. The two intake valves may be spaced closer to the exhaust valve than to each other. The two intake valves may, alternatively, be spaced closer to each other than to the exhaust valve and two spark plugs may be provided, each lying between an intake valve and the exhaust valve. For best results, the two intake valves have substantially equal diameters, with the diameter of the exhaust valve having a ratio to the diameter of an intake valve of from about 1:1 to about 1:1.2. The head has three substantially hemispheric depressions each housing one of said valves. Squish areas are preferably provided between each pair of adjacent valves around the combustion chamber periphery. This invention provides a fast and uniform lean burn, permits use of a high compression ratio and lower octane, unleaded gasoline and provides improved thermal efficiency.

38 Claims, 3 Drawing Sheets

COMBUSTION CHAMBER SYSTEM HAVING AN IMPROVED VALVE ARRANGEMENT

This is a continuation-in-part of application Ser. No. 07/995,785 filed on Dec. 23, 1992, now U.S. Pat. No. 5,313,921.

BACKGROUND OF THE INVENTION

This invention relates in general to improvements in internal combustion engines and, more specifically, to an improved cylinder head and piston arrangement with an improved valve and spark plug layout for use in those engines.

A great many different intake and exhaust valve arrangements have been developed over the years for use in internal combustion engines, in particular for use in automobiles. Most such engines use one intake valve and one exhaust valve at each cylinder with a single spark plug. The prior art arrangements utilize exhaust area intake area in the range of over 65%. A great deal of effort has gone into optimizing the sizing and placement of the valves, the shape of the combustion chamber and the like. Since there is a great need for improvements in automobile fuel efficiency while maintaining or improving performance, a wide variety of different valve and spark plug configurations and arrangements have been designed and tested. In some of these, multiple valves and spark plugs have been used.

An arrangement of four valves per cylinder, two intake valves and two exhaust valves, has been disclosed, for example, by Akana in U.S. Pat. No. 3,411,490. Today, a number of high performance automobiles use four valve systems, with one or more spark plugs. In these high performance automobiles, several spark plugs may be provided around the periphery of the combustion chamber with an additional spark plug centrally located. Manufacture and operation of these four valve, multiple spark plug engines is complex and expensive and requires complex computer control for efficient operation.

Weslake in U.S. Pat. No. 2,652,039 describes a complex cylinder head arrangement for an internal combustion engine having a wedgeshaped combustion chamber adjacent to the cylinder feeding into a cylinder chamber above the piston. The combustion chamber has an intake valve, an exhaust valve and a single spark plug. A second intake valve is provided in the cylinder chamber. A weak mixture of air and fuel enters the combustion chamber, combustion begins and a rich mixture enters through the cylinder chamber and adds to the original combusting mixture. This very complex system appears to have been unsuccessful and to never have been brought into production.

Another three valve system is described by Von Segern et al in U.S. Pat. No. 3,443,552. Here, a basically conventional cylinder head having a single intake valve and a single exhaust valve with a primary, conventional, combustion chamber is provided. In addition, a centrally located auxiliary chamber is located on the cylinder axis away from the cylinder in gas flow communication with the primary combustion chamber. The auxiliary chamber has a single intake valve and a spark plug. Combustion begins in the auxiliary chamber, spreads to the main combustion chamber where added fuel mixture is introduced. Again, this is a complex and cumbersome system that appears to have been found to be impractical.

Thus, while a great number of different arrangements of multiple valves and/or multiple spark plugs have been designed, none have provided an optimum combination of structural simplicity, maximum fuel efficiency and highest performance. Thus, despite the crowded nature of the automobile engine fuel and air introduction and exhaust removal art, there remains a continuing need for improvements providing greater overall efficiency at lowest cost.

It is, therefore, an object of this invention is to provide a simple, easily manufactured internal combustion engine combustion chamber system having increased operating efficiency. Another object is to provide such as system that provides both increased fuel efficiency and higher performance. A further object is to provide such a system with high thermal efficiency. Yet another object is to provide a system capable of operating at high compression ratios with a variety of different fuels.

SUMMARY OF THE INVENTION

The above-noted objects, and others, are accomplished, basically, by a three valve combustion chamber system for use with internal combustion engine containing a piston and a cylinder head forming a combustion chamber therebetween. The system comprises three valves in the cylinder head, spaced around the cylinder axis, two of the valves adapted to act as intake valves and the third as an exhaust valve. The two intake valves preferably have the same diameter and surface area, with the exhaust valve preferably having the same or slightly greater diameter. The ratio of total exhaust valve cross-sectional area/total intake valve cross-sectional area is ideally less than 65% and can be in the range of 50% to 65%.

In a first version, three peripheral spark plugs are substantially centrally located in the areas surrounded by adjacent valves and the edge of the combustion chamber. A central, fourth, spark plug may be located substantially on the cylinder axis, surrounded by the three valves. A second version has a single central spark plug located substantially on the cylinder axis, surrounded by the three valves. If desired, the system of this invention may be used in a diesel or other engine using an ignition system other than a spark plug.

The cylinder head surface forming one side of the combustion chamber has hemispheric depressions containing each of the valves, with the piston having approximately flat areas corresponding to the approximately flat areas on the cylinder head located between adjacent valves and the edge of the combustion chamber. These opposed flat areas are configured so that as the flat piston and head areas closely approach each other during engine operation a very efficient "squish" area is created. This arrangement substantially improves combustion and fuel efficiency.

In a preferred embodiment, the three valves may be located towards one side of the combustion chamber with the space between each intake valve and the exhaust valve being less than the distance between the two intake valves. The single central spark plug (or other ignition device) is positioned approximately on the cylinder axis.

In another preferred embodiment, wo equally spaced intake valves are positioned to one side of the combustion chamber, with a single exhaust valves to the other side and two spark plugs, each positioned outwardly of a line between the center of the exhaust valve and the center of an intake valve. The intake valves and spark plugs are symmetrically located on the sides of a line drawn through the center of the exhaust valve and equally spaced between the intake valves. Squish areas are located along the edges of the combustion chamber between each adjacent pair of valves. Optimally, the squish areas between the exhaust valve and each intake valve has a substantially straight edge, approximately parallel to a line drawn between the centers of the exhaust valve and the intake valve.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
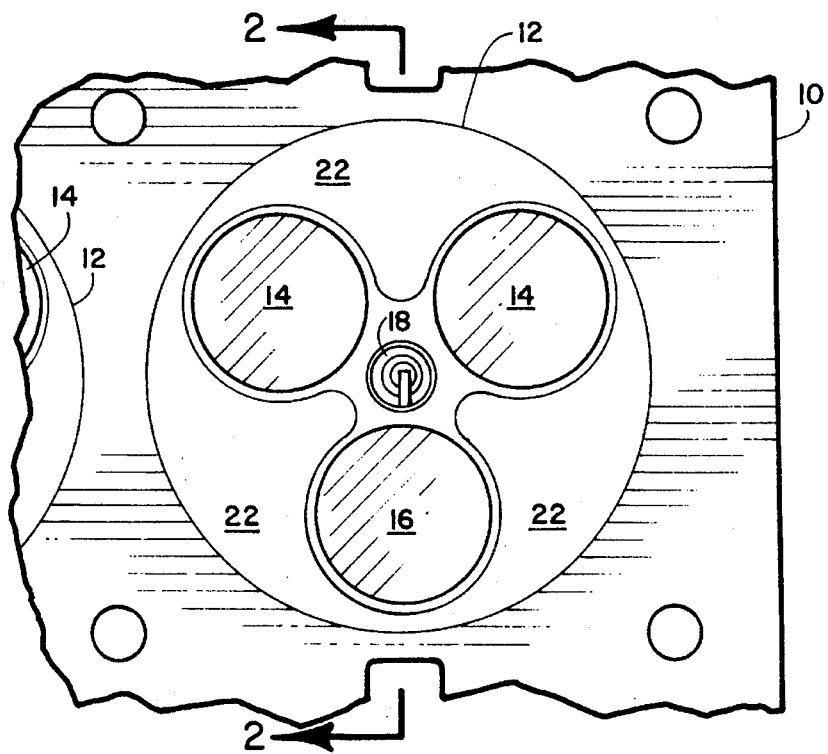
FIG. 1 is a plan view of the face of a cylinder head combustion chamber, showing a first embodiment of this invention.
Figure 2:
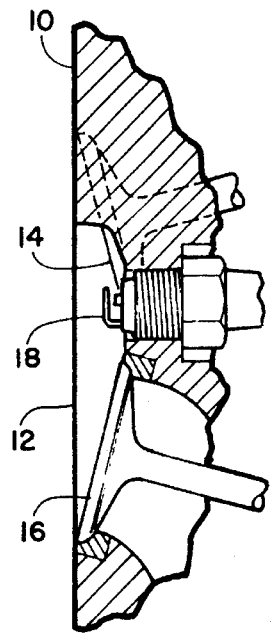
FIG. 2 is a section view, taken substantially on line 2—2 in FIG. 1.

Referring to FIGS. 1 and 2, there is seen a cylinder head 10 having a recessed combustion chamber 12. Head 10 has a number of conventional bolt holes, vents and the like 11 for attachment of the head to the engine block (not shown) and other purposes. Two intake valves 14 open to allow entry of air or an air-fuel mixture into combustion chamber and closed during combustion. One exhaust valve 16 is closed during combustion and opens to allow egress of exhaust gases. Optimally, the faces of valves 14 and 16 are circular and the three valves are substantially uniformly arranged around the cylinder and combustion chamber axis. The shafts may be canted to the cylinder centerline or vertical; that is, parallel to the cylinder centerline, as desired.

The faces of intake valves 14 preferably have the same area so that identical open areas are provided when the valves open and gas flow therethrough is uniform in pattern and volume for optimum efficiency. Exhaust valve 16 ideally has a diameter equal to or slightly greater than that of an intake valve 14, preferably a diameter ratio of from about 1:1 to about 1:1.2. The ratio of total exhaust valve cross-sectional area/total intake valve cross-sectional area is ideally less than 65% and can be in the range of 50% to 65%.

The utilization of the small exhaust port cross-sectional area and valves provides high exhaust gas velocity, on the order of 450 ft/sec. Intake gas velocity, depending on mass, volume and/or the presence of fuel would be in the 225 to 300 ft/sec range. This configuration yields excellent operating characteristics, including throttle response, exhaust gas scavenging, charge purity and octane variation tolerance. Improved thermal efficiency allows for significantly reduced heat transfer.

In the embodiment of FIG. 1, one central spark plug 18. A central spark plug 18 is shown located substantially on the cylinder centerline and may extend above the surface of the combustion chamber 12, in the preferred arrangement, as shown or may be recessed slightly below the surface, if desired.

Figure 3:
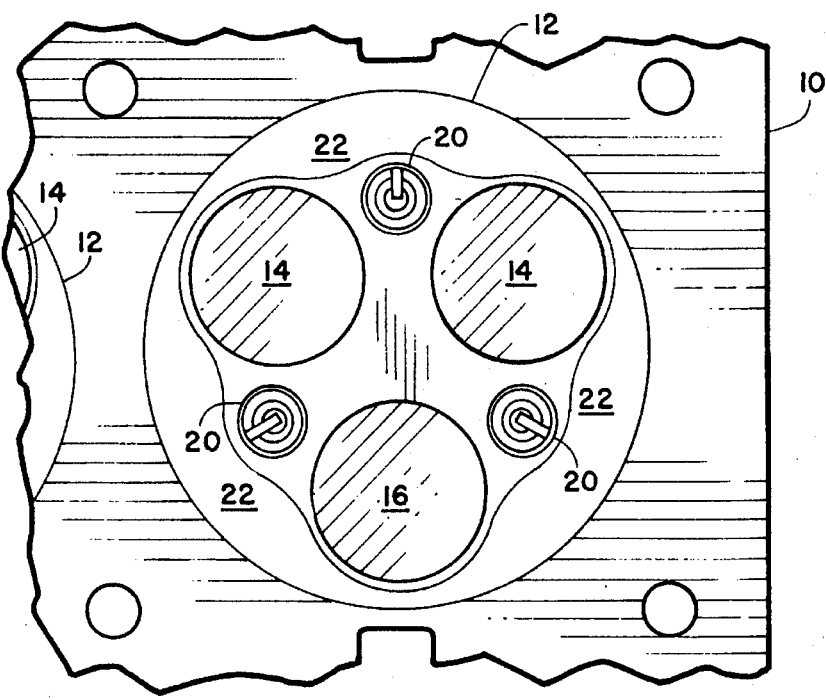
FIG. 3 is a plan view similar to FIG. 1 but showing a second embodiment of the invention.

In the alternative embodiment shown in FIG. 3, three peripheral spark plugs 20 are used. While optimum efficiency may in some instances by the addition of a fourth spark plug centrally located in the FIG. 3 embodiment, the embodiment of FIG. 3 is less costly and in many cases provides more or at least sufficient efficiency.

If desired, only a single central spark plug 18 may be used.

Figure 4:
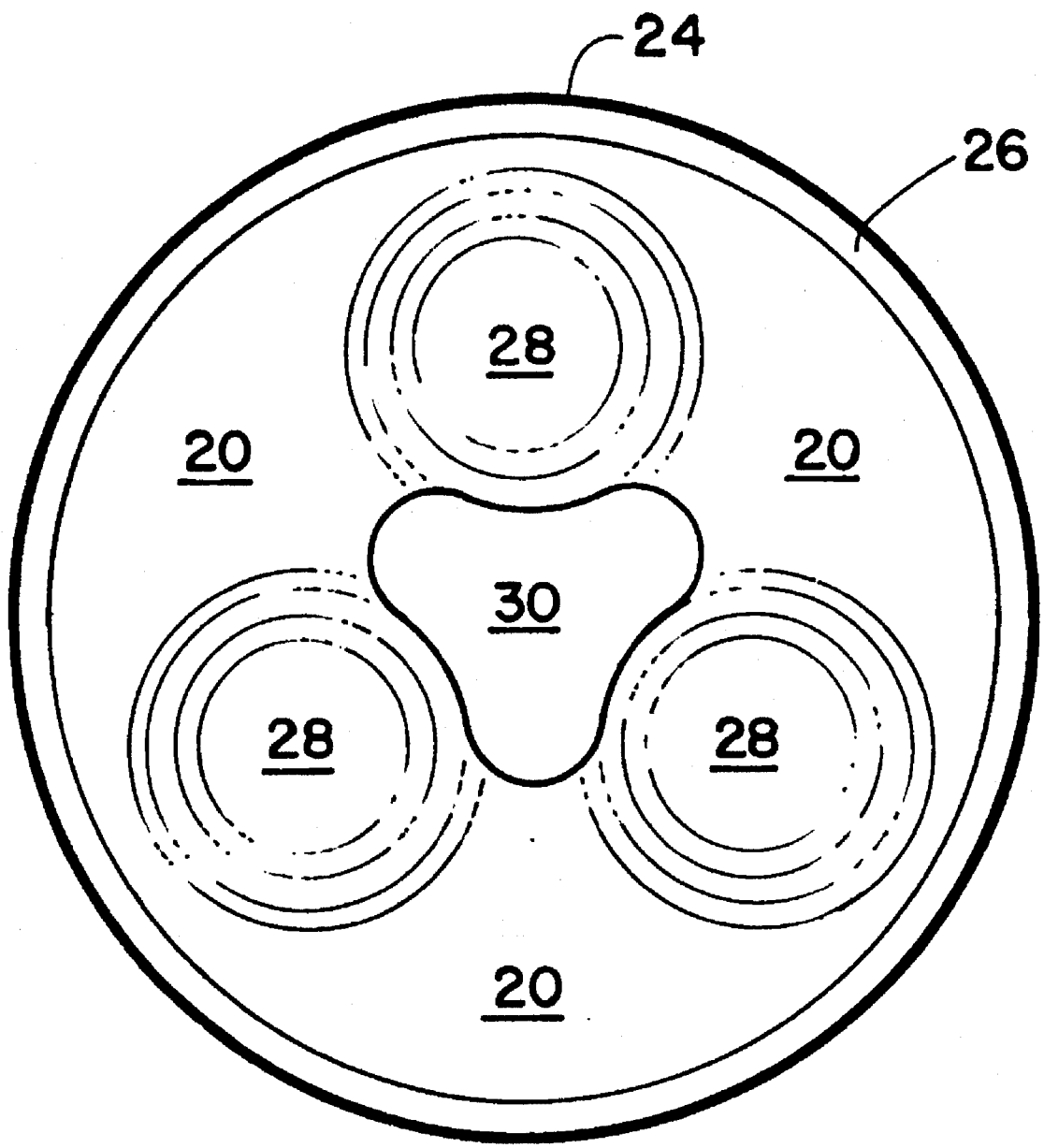
FIG. 4 is a plan view of a piston face configuration useful with this invention.

FIG. 4 shows the face of a piston 24 optimized for use with the combustion chamber 12 arrangement shown in FIGS. 1–3. For optimum combustion a "squish" area is often desired between portions of the opposed faces of piston 24 and combustion chamber 12. In that case, the areas 22 are flat and slightly tapered away from piston toward the combustion chamber centerline and the corresponding areas 26 are similarly flat and slightly tapered so that those areas closely approach each other as piston 24 makes its closest approach to combustion chamber 12 during engine operation, squeezing the fuel/air mixture in those areas toward the center of combustion chamber 12. Areas 22 and 26 lie approximately perpendicular to the centerline of the combustion chamber and cylinder. This "squish" effect has been found to improve combustion efficiency. Recessed areas 28 are formed in the face of piston 24 around central pad 30 to provide the desired compression ratio in conjunction with the squish areas. Recessed areas 28 are sized to provide the desired compression ratio in conjunction with the squish areas.

Figure 5:
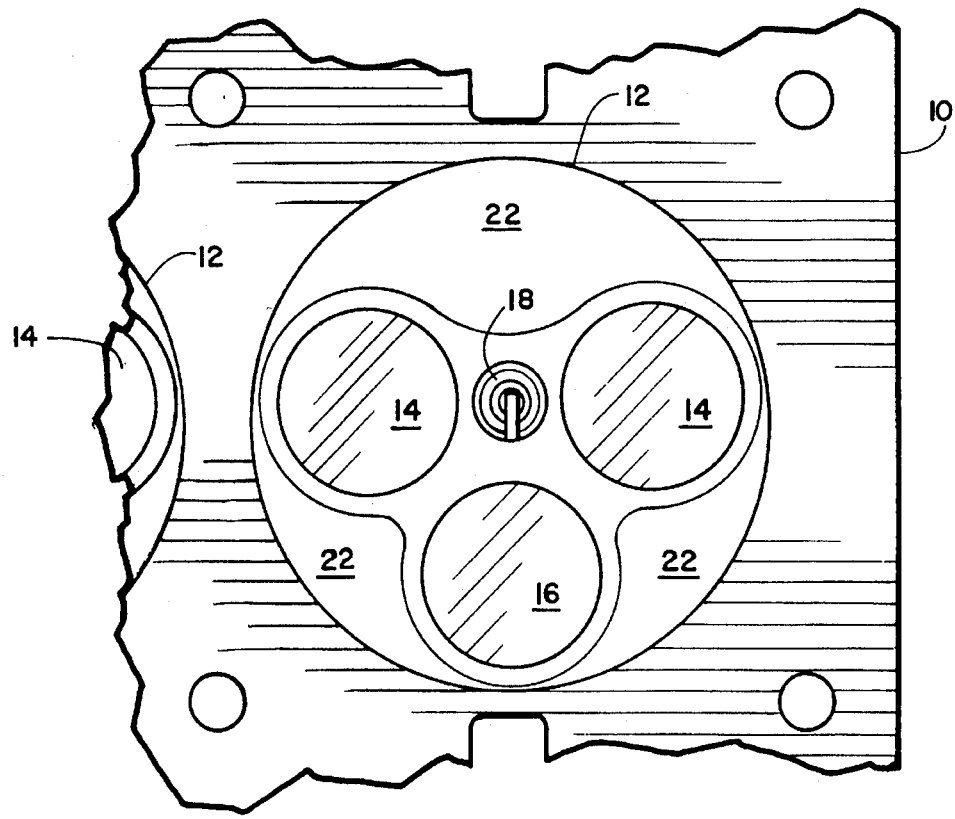
FIG. 5 is a plan view similar to FIG. 1 but showing a third embodiment of the invention.

FIG. 5 shows a plan view of another embodiment of the combustion chamber system. Here, the combustion chamber 12 in cylinder head 10 has a generally similar configuration to that shown in FIG. 1, but with a different valve arrangement. Intake valves 14 are positioned closer to exhaust valve 16 than to each other. The size relationship among the valves is the same as described above. Squish plates 22 of the sort described above are provided between adjacent valves, with the squish plate between the two intake valves 14 being larger in area than that between each intake valve 14 and the exhaust valve 16. The embodiment shown in FIG. 5 is particularly useful in permitting an offset pushrod arrangement for operating the valves. If desired, three spark plugs 18 could be used, spaced around the periphery between each adjacent pair of valves, as shown in FIG. 3. Or, three spark plugs oriented as shown in FIG. 3 plus a centrally located plug as seen in FIG. 1 could be used together.

Figure 6:
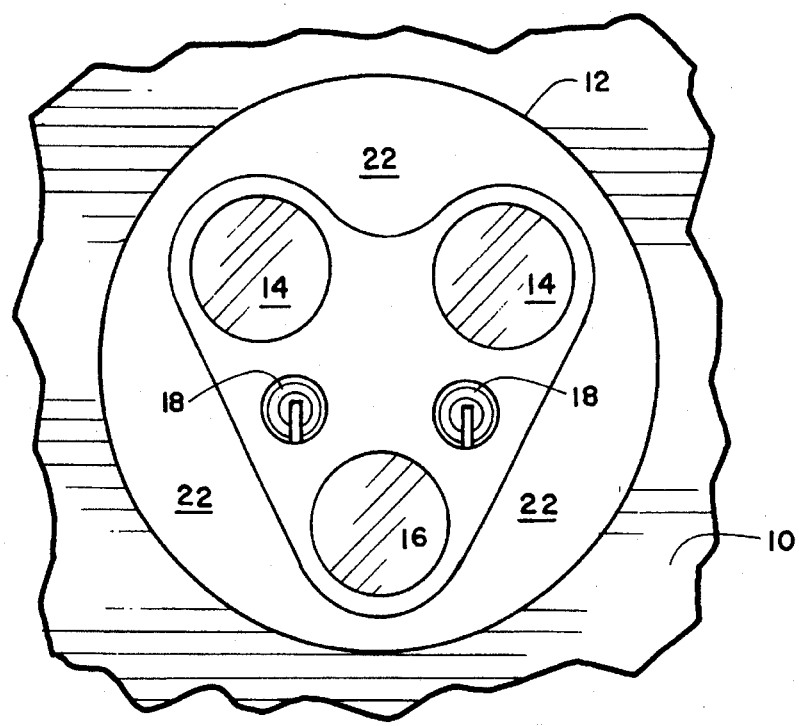
FIG. 6 is a plan view similar to FIG. 1 but showing a fourth embodiment of the invention.

FIG. 6 shows a plan view of another embodiment of the combustion chamber system. Here, the combustion chamber 12 in cylinder head 10 has a generally similar configuration to that shown in FIG. 1, but with a different valve arrangement. Two intake valves 14 are positioned to one side of chamber 12, with exhaust valve 16 to the other side. Two spark plus 18 are located between exhaust valve 16 and each intake valve 14. Each spark plug 18 is positioned outwardly of a line drawn between the center of exhaust valve 16 and each intake valve 14. A line of symmetry can be drawn from the center of exhaust valve between and equally spaced from intake valves 14. The combustion on one side of that line of symmetry is a mirror image of the other side. For optimum operation, squish areas 22 are provided between each adjacent pair of valves, with the edge of the squish areas between exhaust valve 16 and each intake valve 14 being a substantially straight line drawn approximately parallel to a line drawn through the centers of the exhaust valve 16 and an intake valve 14. While the arrangement shown with two spark plugs in FIG. 6 is preferred, if desired three peripheral plugs as shown in FIG. 3 and/or a central plug as shown in FIG. 1 could be used.

While certain preferred materials, dimensions and arrangements have been described in detail in conjunction with the above description of preferred embodiments, those can be varied, where suitable, with similar results. For example, in the embodiment shown in FIG. 6, a single spark plug could be used at the center of the cylinder (as shown in FIG. 5) instead of the two spark plugs shown. Other applications, variations and ramifications of this invention will occur to those skilled in the art upon reading this disclosure. Those are intended to be included within the scope of this invention, as defined in the appended claims.

I claim:

1. An improved combustion chamber system for use with internal combustion engine having at least one piston and a cooperating cylinder head forming a combustion chamber therebetween, which comprises:
   three valves in the head at the combustion chamber, said valves being arranged around an axis of the cylinder;
   two of the valves having substantially equal areas and adapted to act as intake valves;
   the third of said valves having an area equal to, or slightly greater than, the area of one of the intake valves, the third valve being adapted to act as an exhaust valve;
   said two intake valves being spaced a greater distance from each other than from said exhaust valve;
   said piston having a generally planar surface adjacent to said head forming one wall of the combustion chamber; and
   at least one ignition means for igniting an air/fuel mixture in the combustion chamber, said ignition means located entirely within said head without extending below the plane of said piston's generally planar surface at any point during engine operation.

2. The system according to claim 1 wherein said ignition means comprises a single spark plug located in said head approximately at said cylinder axis.

3. The system according to claim 1 wherein each of said valves is substantially circular and the ratio of diameters of the intake valves to the diameter of the exhaust valve are from 1:1 to 1:1.2.

4. The system according to claim 1 wherein said head includes three hemispheric depressions each housing one of said valves.

5. The system according to claim 1 wherein the exhaust area/intake area ratio is less than approximately 65%.

6. The system according to claim 1 wherein the exhaust area/intake area ratio is from 50% to 65%.

7. The system according to claim 1 wherein squish areas are provided along the combustion chamber periphery between each pair of adjacent valves, a squish area between said intake valves having an area greater than a squish area between said exhaust valve and an adjacent intake valve.

8. The system according to claim 1 wherein said two intake valves have substantially equal areas.

9. The system according to claim 1 wherein said ignition means comprises a single spark plug located in said head substantially on said cylinder axis.

10. The system according to claim 1 wherein said ignition means comprises at least three spark plugs.

11. The system according to claim 10 further including a fourth spark plug located in said head substantially on said axis of said cylinder.

12. The system according to claim 1 wherein each of said valves is substantially circular and the ratio of diameters of the intake valves to the diameter of the exhaust valve is approximately 1:1.

13. The system according to claim 1 wherein each of said valves is substantially circular and the ratio of diameters of the intake valves to the diameter of the exhaust valve is approximately 1:1.2.

14. The system according to claim 1 wherein the exhaust area/intake area ratio is approximately 50%.

15. The system according to claim 1 wherein the exhaust area/intake area ratio is approximately 65%.

16. An improved combustion chamber system for use with internal combustion engine having at least one cylinder each having a piston and a cylinder head forming a combustion chamber therebetween, comprising:
   three valves in the head at each combustion chamber, the valves being arranged around the axis of the cylinder;
   two of said valves having substantially equal areas and adapted to act as intake valves;
   the third of said three valves having an area substantially equal to, or slightly greater than, the area of one of the intake valves, the third valve being adapted to act as an exhaust valve;
   said two intake valves positioned closer to each other than to said exhaust valve; and
   said head having three approximately hemispherical recesses, each of the recesses housing one of the valves.

17. The system according to claim 16 further including an ignition means comprising a single spark plug located in said head approximately at the cylinder centerline.

18. The system according to claim 16 wherein said ignition means comprises at least three spark plugs.

19. The system according to claim 18 further including a fourth spark plug located in the head substantially on the central axis of said cylinder.

20. The system according to claim 16 further including squish areas are provided along the combustion chamber periphery between each pair of adjacent valves, the squish area between said intake valves having an area greater that the squish area between said exhaust valve and an adjacent intake valve.

21. The system according to claim 16 wherein each of the valves is substantially circular and the ratio of diameters of the intake valves to the diameter of the exhaust valve are from 1:1 to 1:1.2.

22. The system according to claim 16 wherein the head includes three hemispheric depressions each housing one of the valves.

23. The system according to claim 16 wherein the exhaust area/intake area ratio is from 50% to 65%.

24. The system according to claim 16 wherein each of the valves is substantially circular and the ratio of diameters of the intake valves to the diameter of the exhaust valve is approximately 1:1.

25. The system according to claim 16 wherein each of the valves is substantially circular and the ratio of diameters of the intake valves to the diameter of the exhaust valve is approximately 1:1.2.

26. The system according to claim 16 wherein the exhaust area/intake area ratio is approximately 50%.

27. The system according to claim 16 wherein the exhaust area/intake area ratio is approximately 65%.

28. An improved combustion chamber system for use with internal combustion engine having at least one piston and a cooperating cylinder head forming a combustion chamber therebetween, which comprises:
   three valves in the head at the combustion chamber, said valves being arranged around the axis of the cylinder;
   two of said valves having substantially equal areas and adapted to act as intake valves;

the third of the valves having an area substantially equal to, or slightly greater than, the area of one of the intake valves, the third valve being adapted to act as an exhaust valve;

said two intake valves being spaced a greater distance from said exhaust valve than from each other;

said piston having a generally planar surface adjacent to said head forming one wall of the combustion chamber; and two spark plugs located between said exhaust valve and each of said intake valves, said spark plugs located outside of a line drawn between the center of said exhaust valve and the center of the corresponding intake valve.

29. The system according to claim 28 wherein squish areas are provided along the combustion chamber periphery between each pair of adjacent valves, the squish area between said intake valves being less than the squish area between said exhaust valve and an adjacent intake valve.

30. The system according to claim 29 wherein each squish area between said exhaust valve and an intake valve has a substantially straight edge portion, said straight edge portion being approximately parallel to a line drawn between the centers of said exhaust valve and an intake valve.

31. The system according to claim 28 wherein said intake valves and spark plugs are symmetrically located on the sides of a line drawn through the center of the exhaust valve and equally spaced between the intake valves.

32. The system according to claim 28 wherein each of the valves is substantially circular and the ratio of diameters of the intake valves to the diameter of the exhaust valve are from 1:1 to 1:1.2.

33. The system according to claim 28 wherein said head includes three hemispheric depressions each housing one of said valves.

34. The system according to claim 28 wherein the exhaust area/intake area ratio is from 50% to 65%.

35. The system according to claim 28 wherein each of the valves is substantially circular and the ratio of diameters of the intake valves to the diameter of the exhaust valve is approximately 1:1.

36. The system according to claim 28 wherein each of the valves is substantially circular and the ratio of diameters of the intake valves to the diameter of the exhaust valve is approximately 1:1.2.

37. The system according to claim 28 wherein the exhaust area/intake area ratio is approximately 50%.

38. The system according to claim 28 wherein the exhaust area/intake area ratio is 65%.

* * * * *